United States Patent [19]
Lacey

[11] 3,742,345

[45] June 26, 1973

[54] SHORT FINDER WITH A PAIR OF INDICATORS HAVING DIFFERENT RESISTANCE VALUES AND ACTUATED BY DIFFERENT CURRENT MAGNITUDES

[76] Inventor: Benjamin R. Lacey, 8238 Forrest Avenue, Philadelphia, Pa. 19117

[22] Filed: May 12, 1971

[21] Appl. No.: 142,765

Related U.S. Application Data

[63] Continuation-in-part of Ser. No. 818,575, April 23, 1969, abandoned.

[52] U.S. Cl. .............................................. 324/52
[51] Int. Cl. .............................................. G01r 31/08
[58] Field of Search .................... 324/51, 53, 52; 340/255

[56] References Cited
UNITED STATES PATENTS

| | | | |
|---|---|---|---|
| 389,758 | 9/1888 | Morrell | 324/51 |
| 396,582 | 1/1889 | Loomis | 324/51 |
| 2,186,212 | 1/1940 | Scoggin | 324/51 |
| 2,851,659 | 9/1958 | Ladrick | 324/51 X |

Primary Examiner—Gerard R. Strecker

[57] ABSTRACT

A Short Finder including a primary circuit connected into an automotive terminal block, with the primary circuit having indicating means such as a bulb that is actuated by a high current. The primary circuit is linked to a secondary circuit which includes a buzzer. Until the short in an accessory circuit is located and corrected, the resistance added to the primary circuit is very low (because of the short) and therefore the indicator light of the primary circuit will remain lit because of the high current. When the short in the accessory circuit is located and corrected, the resistance in the primary circuit becomes relatively large and is large as compared to the resistance in the secondary circuit. Therefore the secondary circuit now draws a sufficient amount of current to actuate the buzzer in the secondary circuit. In view of the foregoing the technician knows that so long as the bulb in the primary circuit is lit, he has not found and corrected the short, in the accessory circuit. As soon as the short is located and corrected the bulb will go out and the buzzer will sound, and in this way the technician knows he has completed his job. It is preferred that the secondary circuit have a resistance of at least 10 times the primary circuit (excluding the resistance of the accessory-clock, dash lights, etc.—in the particular accessory circuit involved).

1 Claim, 1 Drawing Figure

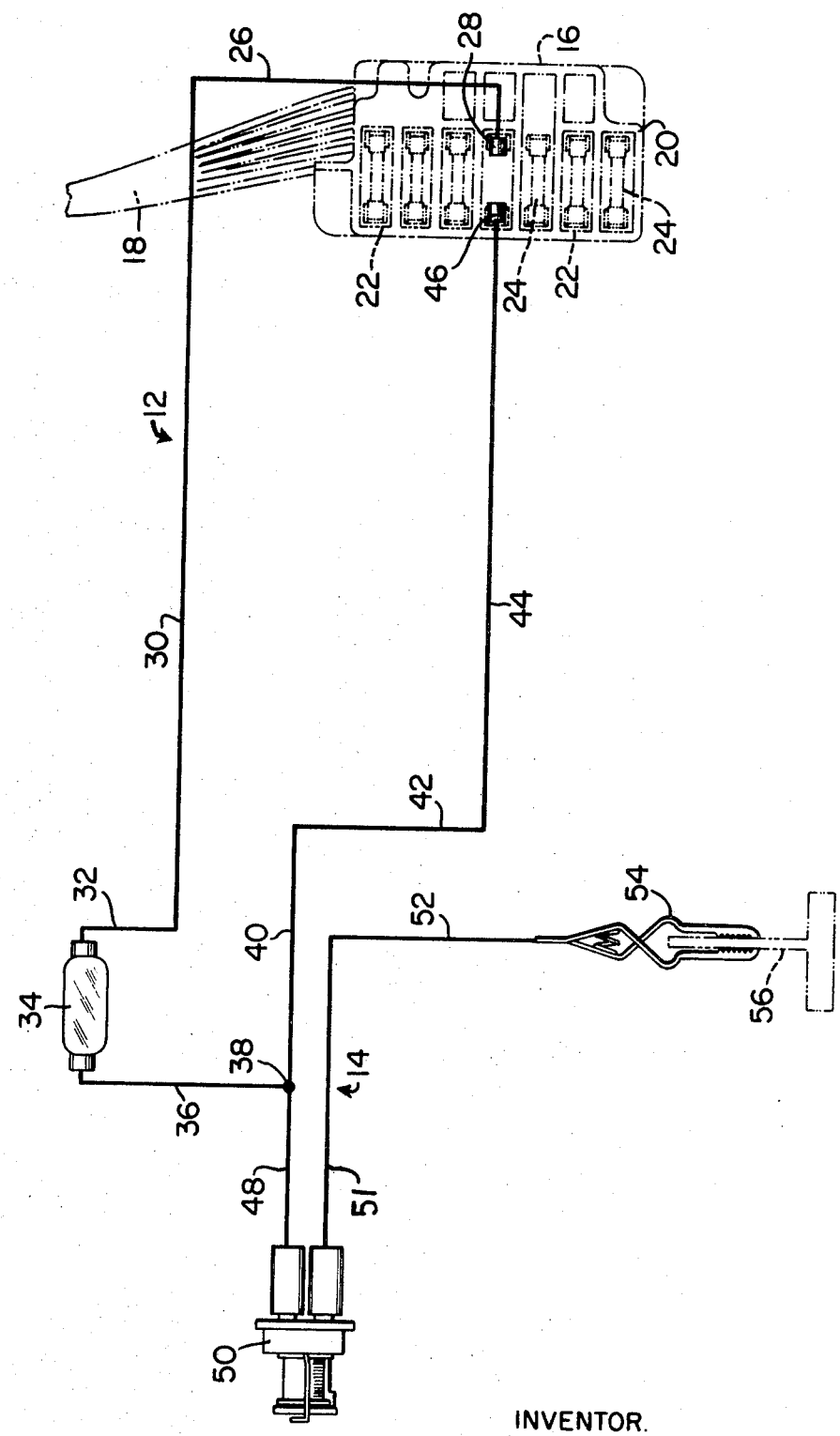

SHORT FINDER WITH A PAIR OF INDICATORS HAVING DIFFERENT RESISTANCE VALUES AND ACTUATED BY DIFFERENT CURRENT MAGNITUDES

This is a continuation-in-part based on application Ser. No. 818,575, filed Apr. 23, 1969 and entitled Automotive Short Finder, now abandoned.

This invention relates to a short finder and in particular to a device which can be used by a technician in the automotive industry.

It is known to use various devices in attempts to locate a short circuit in the circuit of the various accessories of an automobile which are known as accessory circuits. However, the location of the short is still largely dependent upon the ability of the technician, and indeed a certain amount of luck is always involved in the location of a short.

In view of the foregoing the location of short circuits is time consuming, annoying and expensive.

It is therefore an object of the present invention to provide a short finder which is relatively simple in construction and use, and also relatively low in cost.

The principal object of the present invention is achieved by providing a short finder to locate a short in an accessory circuit. The short finder of the present invention involves a primary circuit which is directly connected into the accessory circuit, and a secondary circuit which is connected to the primary circuit. The primary circuit includes a bulb or light indicating means that is actuated by aa relatively high current. So long as the short has not been located and corrected the primary circuit resistance is low and so draws a large amount of current relative to the secondary circuit. Thus the bulb remains lit. As soon as the short is located and corrected the resistance in the primary circuit becomes relatively high compared to the resistance in the secondary circuit, and therefore the secondary circuit draws most of the current which is sufficient to actuate a buzzer in the secondary circuit. It is to be understood that the buzzer in the secondary circuit can be replaced with a light or other indicating means, and obviously the bulb in the primary circuit could be replaced with a buzzer or other indicating means, if so desired. As stated in the Abstract, the secondary circuit resistance should be substancially higher than the primary circuit resistance.

The present invention is illustrated in the single FIGURE of the drawing wherein reference characters are used for purposes of understanding the description of the invention.

As can be seen in the single FIGURE of the drawing the short finder of the present invention comprises a primary circuit 12 and a secondary circuit 14. The primary circuit 12 is directly connected to a terminal block 16 with accessory harness 18 that is connected into the automotive battery and the various accessory circuits, like the automobile radio, the various lights on the automobile, the blower and other electrical devices which are well known. The accessory block 16 is of well known construction and basically comprises a housing 20 containing a series of chambers 22 which have at least a so-called hot terminal and a so-called cold terminal. As further indicated in dashed lines various chambers 22 are constructed to receive fuses 24 which protect the various circuits from overload. As is well known the primary purpose of the fuses 24 is for protection of the circuitry, such that when one of the fuses 24 is blown, this is an indication that there is a short circuit in the circuit to which the particular fuse is connected.

It will be seen that the primary circuit 12 includes a conductor 26 having a lead 28 connected to the hot side or terminal of each accessory circuit. The primary circuit 12 further includes a conductor 30 and 32 which terminates at one terminal of the indicating light or bulb 34. Another conductor 36 runs from the other terminal of the bulb 34 to junction 38. The primary circuit is coupled by conductors 40, 42, 44 to lead 46. It will be seen that bulb 34 is in series with the car battery that feeds power to the hot terminal.

The secondary circuit includes a conductor 48 that is connected to a buzzer 50 which is constructed in accordance with details well known to those skilled in the art. Another conductor 51 is provided as well as a conductor 52 to which is attached an alligator clip 54 that is grounded on element 56. Thus at junction 38 the current divides into two paths. One current path passes through the buzzer 50 while the other path leads to the cold terminal of the accessory circuit and to the accessory itself.

In use when one of the fuses 24 is blown, it is removed, the alligator clip 54 is then secured to the element 56 for grounding purposes, and the lead 28 is then inserted in good mechanical contact with a terminal in the accessory block. It is important that the lead 28 be placed in the so called hot or positive terminal. This is easily located since the technician will know that the lead 28 is properly placed when the buzzer 50 sounds. The other lead 46 is then placed in the complementary terminal. The buzzer 50 willl now be silent and the bulb 34 will now be lit.

As previously stated the light 34 is now lit. This condition will remain until the short is located and corrected. In order to locate the short the technician need simply disconnect the various devices on the circuit one by one. Until the short is located and corrected the light (34) will remain lit and the buzzer 50 will be silent. If the short cannot be located by simple disconnection of the parts, one by one, then the technician should attempt other things like tugging on the wires or other leads or bending the wires away from the body of the car.

Until the short is located and corrected the resistance added to the primary circuit 12 will be rather low compared to the resistance in the secondary circuit 14 since a short circuit in the accessory circuit produces a heavy negative potential.

Thus, most of the current will flow from lead 28 thru conductors 26, 30, 32, thru bulb 34 and then through conductors 36, 40, 42, 44 and back to lead 46. Therefore there will be very little current in the secondary circuit 14 and therefore the buzzer 50 will remain inactive whereas the bulb 34 in the primary circuit will be lit. It is to be noted that the bulb 34 can be lit only by a relatively high current which is drawn by the primary circuit 12 until the short is located. Thus the current divides a point 38. Some of the current goes to the buzzer and the rest goes back to the battery.

When the short is located and corrected the resistance added to the primary circuit 12 now becomes relatively high. Thus the primary circuit 12 draws a somewhat smaller current which is insufficient to light the bulb 34, hence the bulb 34 will become dark immediately upon location of the short. Now, the resistance in the secondary circuit 14 is low compared to the resistance added to the primary circuit 12. Thus, the bulk of the current dividing at point 38 is drawn by the secondary circuit 14 and such current is sufficient that the buzzer 50 becomes operative immediately to tell the technician that the short has been located.

It is thus seen that the short finder of the present invention can be used quite simply. All that need be done is to place the alligator clip 54 on a proper ground, to apply leads 28 and 46 to the accessory terminal block, and then start to check out the various devices of the accessory circuit by disconnecting them one by one from the circuit. So long as the bulb 34 is lit and the buzzer 50 silent the technician knows that he must continue to look for the short. At the instant the short is located, a buzzer sounds, and the technician knows that his job is finished.

From the foregoing it can be seen that until the short is located and corrected, the current in the primary circuit should be sufficient to light the bulb 34, but in view of the short, most of the current passes at point 38 back to the battery and very little current passes to buzzer 50 and is insufficient to actuate the buzzer. When the short is located and corrected, the overall circuit has a higher resistance value, and less current flows from the battery to bulb 34, and is insufficient to light bulb 34. However, most of this lower non-short current now divides at point 38 in favor of buzzer 50 with just a small amount of current moving back toward the battery to operate a clock, etc., in the accessory circuit which previously had a short.

In view of the foregoing the relationship of the resistance values in the primary and secondary circuits are somewhat critical, particularly because the bulb 34 is in series with the battery while the buzzer 50 and the accessory are in parallel with the battery. It has been determined and can be shown that the resistance in the secondary circuit should be at least ten times the resistance in the primary circuit. Thus, in an actual short tester a thirty-five ohm buzzer was used, whereas a one ohm bulb was used.

What is claimed as the invention is:

1. A short finder for use in an automotive accessory circuit including at least one accessory device of relatively high resistance except when shorted and a battery, said short finder comprising a first conductor having a lead terminal for connection to the hot side of said accessory device, bulb means actuated by a relatively high current, buzzer means actuated by a relatively moderate current, a second conductor having a ground terminal for connecting said second conductor means to a ground connection; said first conductor, said bulb means, said buzzer means and said second conductor being connected in series circuit, a third conductor connected to the series junction of said bulb means and said buzzer means and having a lead terminal for connection to the cold side of said accessory device, said first conductor and said bulb means constituting a primary circuit, said buzzer means and said second conductor constituting a secondary circuit whereby said primary circuit and said secondary circuit are connectable to said accessory device by said lead terminals and ground terminal in such a way that said primary circuit is in series with said accessory device and battery, with said secondary circuit and accessory device being in parallel with said battery, the resistance value of said secondary circuit being approximately 35 ohms and also being at least ten times the resistance value of said primary circuit whereby when a short in said accessory circuit exists, said bulb means are actuated by the relatively large short current in said primary circuit as drawn by the short, and said buzzer means are deactivated as the primary circuit at short draws practically all current from said battery and very little current flows in said secondary circuit such that said buzzer means which require a relatively moderate current are not activated, but when said short is corrected the high resistance of said accessory device is added to said primary circuit which now can draw but a small current because of its high resistance, whereby said bulb means requiring a relatively large current are dark, and said secondary circuit is now of relatively low resistance to draw a moderate current to activate said buzzer means to tell that the short has been located and corrected.

* * * * *